Patented Feb. 23, 1932

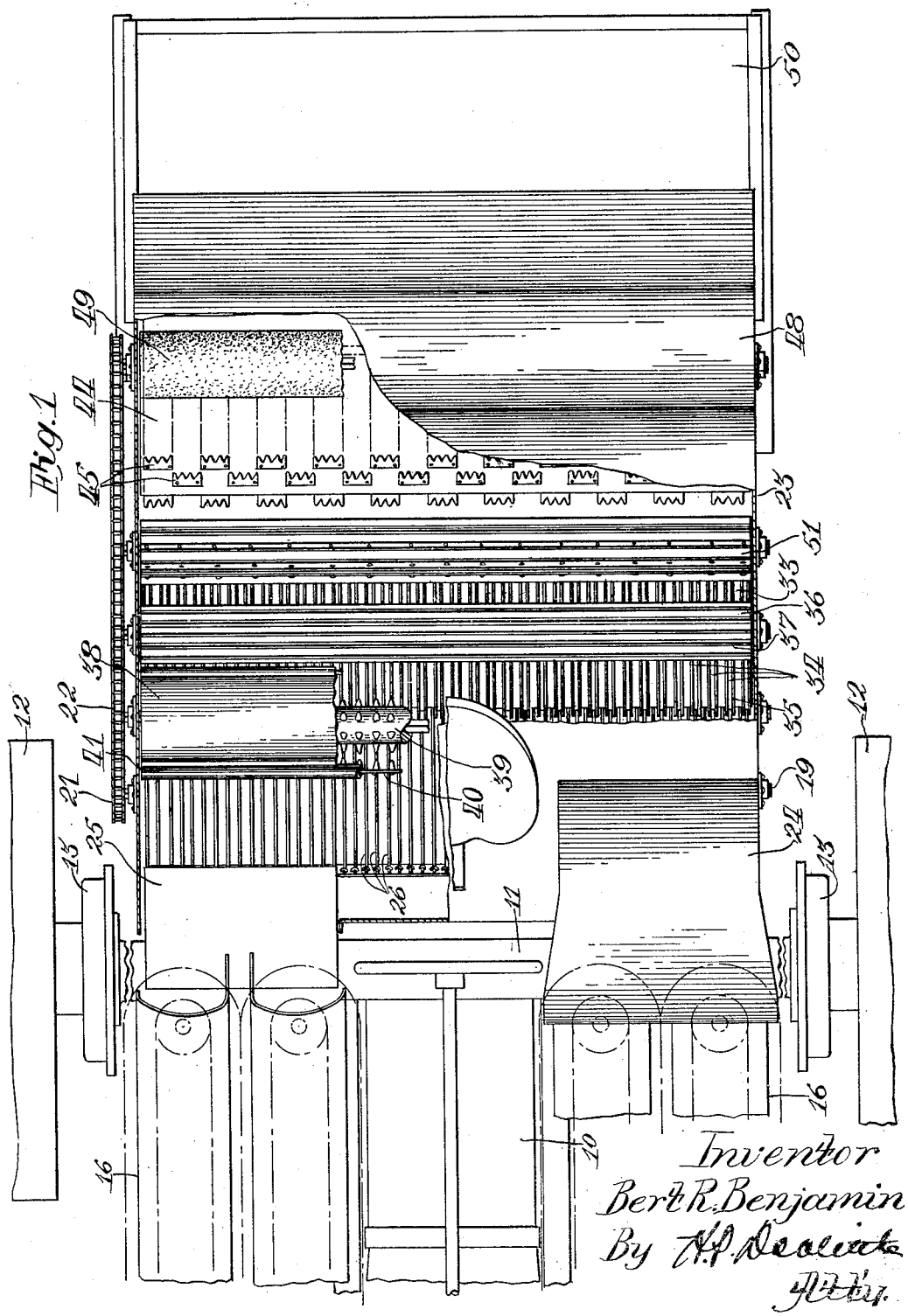

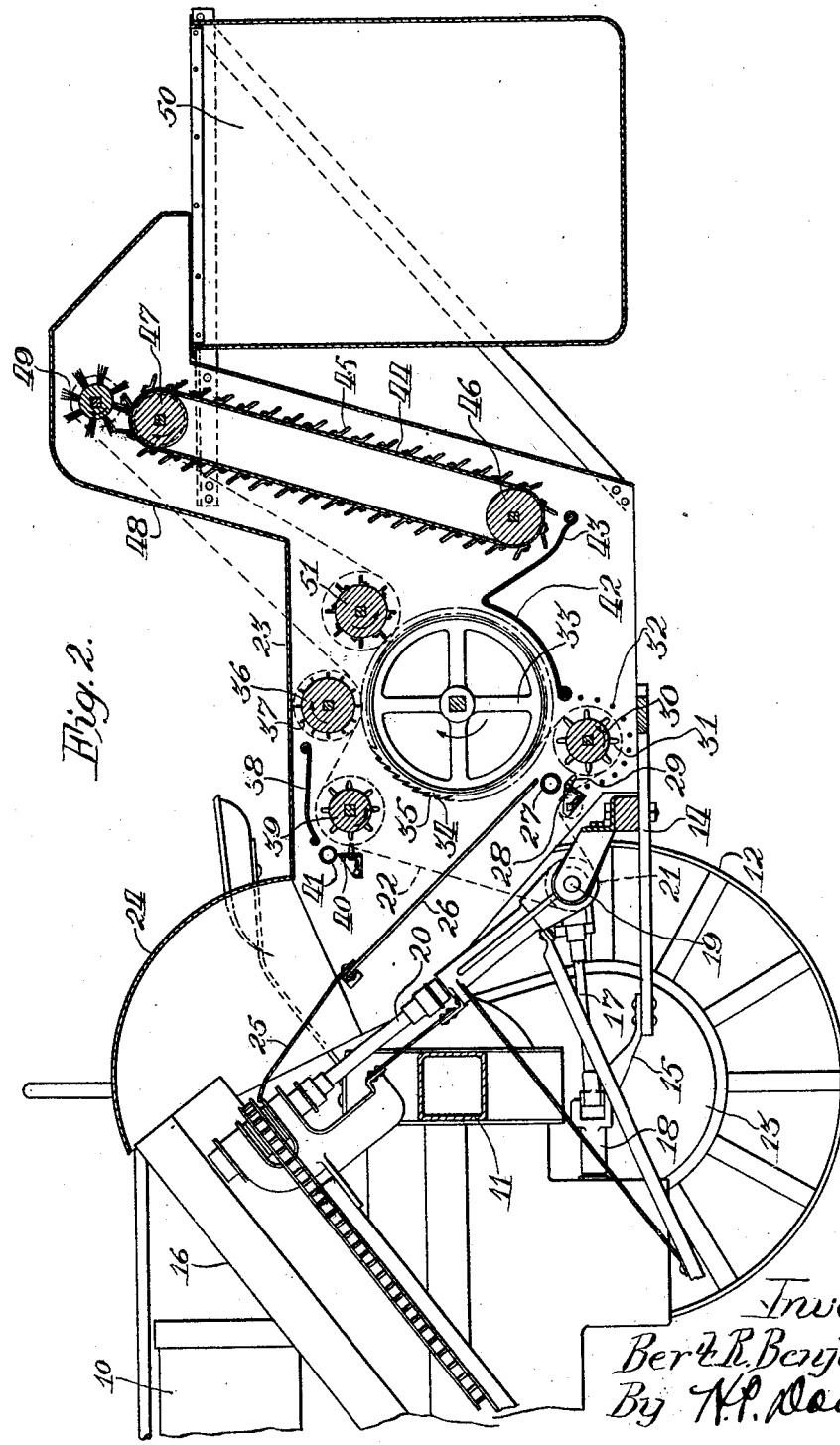

1,846,467

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

COTTON CLEANING DEVICE

Application filed September 20, 1930. Serial No. 483,163.

This invention relates to a cotton cleaning device. More specifically it relates to a cotton boll breaking, separating, and cleaning device particularly adapted for attaching to a tractor operated cotton stripper.

In stripping cotton bolls from the standing plants, scattered cotton fibers remaining after previous pickings and partially opened and unripe bolls together with a certain amount of twigs and branches are removed. This material must be crushed and cleaned before ginning. In my Patent 1,769,104 an improved tractor operated device is described and claimed, which is effective for collecting the bolls with a minimum amount of foreign material.

The principal object of this invention is to devise and construct a machine particularly adaptable for receiving the bolls gathered in this way, crushing the material, and separating the cotton from the bolls and trash. This object and other more specific objects are accomplished by a particular arrangement and operation of material treating elements shown in a preferred embodiment illustrated in the drawings, in which:

Figure 1 is a top plan view, part of which is broken away to show the different elements of the device; and, Figure 2 is a longitudinal section through Figure 1, some of the associated tractor parts being shown in elevation.

The device of this invention consists essentially of crushing mechanisms adapted to disintegrate the cotton bolls and other plant portions that are collected, separating mechanisms adapted to remove the cotton fibers and linters from the disintegrated material, and means for conveying the separated cotton to a receiving means.

In the present instance the invention has been illustrated as embodied in a structure designed for attachment to the rear of a tractor. It is particularly designed for use with an arched axle type of tractor on which a stripper is mounted, such as shown and claimed in my patent previously referred to. Only the rear portion of the tractor and the associated stripper mechanism is shown in these drawings. The tractor is of the type having a narrow body portion 10 connected at its rear end by a transverse axle structure 11 supported on traction wheels 12 attached by stub axles to depending housings 13 at the ends of the axle structure. A drawbar 14 attached by brackets 15 pivotally mounted on the inside of the depending housing provides means for mounting the casing or housing and its supporting structure in which the elements making up this invention are positioned.

The cotton stripper, a portion of which is shown in these drawings, is of a two-row type. A gathering and collecting means 16 extends downwardly at each side of the tractor body 10. The mechanism of these means is driven from the power take-off shaft of the tractor. A shaft 17 connected by a universal joint to the tractor power take-off shaft 18 drives a transverse shaft 19 by a conventional gear mechanism not shown in detail. From the shaft 19 power is transmitted through the shafts 20 to the stripper mechanism. The shaft 19 also extends laterally, as shown in Figure 1, to provide means for driving the cleaning device of this invention. A sprocket 21 mounted on the shaft 19 drives a chain 22, which operates all of the rotatable elements of the device, as will be hereinafter described.

The casing 23, which houses the elements of the device, is constructed largely of sheet metal and an angle iron framework. The construction is conventional in nature and the various individual elements are not shown in detail in this device. The casing is so built and constructed that it may be securely mounted on the drawbar 14 and held in position thereon by suitable bracing means. A curved hood portion 24 at the forward end of the casing extends upwardly over the discharge end of the gathering means 16. An apron 25 extends downwardly from the discharge end of the gathering means 16 and forms with the hood 24 a supply inlet for feeding the gathered material to the casing 23. A grating 26, which is formed from a plurality of closely spaced bars, is attached to the end of the apron 25 and extends downwardly at an angle of about 45 degrees to horizontal. The grating terminates adjacent a supporting pipe 27.

A breaker bar 28 is mounted immediately below the pipe 27. A plurality of projecting teeth 29 are mounted on the breaker bar 28. Adjusting means comprising a slot in end extensions of the bar 28 provide means for varying the position of the breaking bar relative to the crushing rotor 30. The rotor 30 is mounted with its teeth 31 positioned in cooperating relation with the teeth 29 on the breaking bar. A grating is fitted around the bottom of the rotor 30 formed by a plurality of spaced rods 32.

A drum structure 33 of a comparatively large diameter, as shown, is mounted for rotation with its surface operating closely adjacent the periphery of the rotor 30 and slightly spaced from the bottom of the grating 26. A plurality of channel members 34 are mounted in spaced position around the drum 33. Saw-like teeth 35 are formed in the channels 34. The drum is adapted to be rotated with the lower portion traveling toward the grating. The teeth are shaped slanting in the direction of rotation for a purpose which will be hereinafter described.

Above the drum 33 a beater element 36 is mounted on an axis substantially vertical above the axis of the drum. The beater element is in the form of a cylinder having a plurality of bars 37 attached thereto. The bars 37 are positioned to operate closely adjacent the teeth 35 on the drum.

A crushing means is mounted forwardly from the beater member 36. A baffle or apron 38 extends forwardly and is curved downwardly to direct material between a crushing roller 39 and a breaker bar 40. The elements 39 and 40 have cooperating teeth similar to the teeth 29 and 31 on the crushing means previously described. The breaker bar 40 is also adjustable to and away from the crushing roller 39. A pipe 41 fills in the space between the end of the baffle 39 and the breaking bar.

The beater member 36 substantially fills the space between the drum and the top of the casing 23. At the bottom of the drum, the grating formed by the spaced bars 32 terminates adjacent the drum, and a curved baffle 42 conforming to the circumference of the drum extends around the lower portion thereof. A second baffle member 43 is attached to the baffle 42 and extends rearwardly downwardly into cooperating relation with a conveyor 44. Said conveyor consists of an endless apron having a plurality of teeth 45 adapted to engage the cotton thrown thereagainst. The conveyor is mounted on a lower rolling support 46 and an upper driving roller 47. The casing 23 has an upwardly extending portion 48, which houses the upper end of the conveyor and a doffing brush 49. The doffing brush is cylindrical and rotates on a shaft which is driven as will be hereinafter described. A bagging device 50 is attached at the rear of the casing for receiving the cotton removed by the doffing brush.

A doffing member 51 is mounted to rotate adjacent the drum on the rear side between the beater member 36 and the conveyor.

All of the rotative members of this device, with the exception of the supporting roller 46 for the conveyor, are mounted on shafts which extend laterally through one side of the casing 23. Sprockets are mounted on these shafts and they are driven by a single chain 22 clearly shown in Figure 1. The relative sizes of the sprockets are such that the elements will be driven at the proper speeds.

The operation of this device will be clear from the description of the elements. Material gathered by the stripper delivered on the apron 25 slides down the grating 26, a portion of the already broken up material falling through the grating. As the material slides downwardly, the bolls and cotton fibres are engaged by the teeth 35 on the drum, which is rotating with its periphery moving in an upward direction toward the grating. As the bolls are carried upwardly, the beater member 36, which is rotated in the same direction as the drum, engages any projecting material and throws it forwardly against the baffle 38. Any cotton fibres which are caught by the teeth remain on the teeth and are removed by the doffing member 51, which is rotating in a direction opposite to that of the drum. The speed of rotation of the doffing member is such that it has a greater peripheral speed than the drum, whereby the cotton is removed from the teeth and thrown against the conveyor 44. The conveyor carries the cotton upwardly where it is removed by the doffing brush 49 and thrown into the receiving means 50.

The bolls and material thrown against the baffle 38 are deflected downwardly between the breaking bar 40 and the crushing roller 39, the teeth on said elements crushing the material and discharging it downwardly against the grating. As material slides down the grating a second time, a larger percentage of the bolls and materials which have been crushed falls through the grating, the cotton and remaining parts sliding downwardly and being again engaged by the teeth 35 on the drum. Similarly small unbroken bolls and certain other portions will pass between the grating and the drum. These portions are crushed between the breaker bar 28 and the rotor 30. The grating formed by the rods 32 acts as a separator and most of the foreign material and broken bolls pass through the grating. The cotton fiber which is carried on the teeth 31 is picked off by the teeth 35 on the drum. It will be understood that in this way the material being fed to the cleaner is continuously treated until the bolls are broken up and the cotton is removed therefrom.

It is to be understood that applicant has shown only a preferred embodiment of his device and that he contemplates as his invention any modifications falling within the scope of the appended claims.

What is claimed as new is:

1. A cotton cleaning machine comprising a casing having a rotatable drum mounted therein, said drum having a plurality of saw-like teeth covering the periphery, a slanting grating in the casing extending toward the lower side of said drum, means for rotating said drum with the lower side moving toward the grating whereby cotton bolls are engaged by said teeth, a rotary beater mounted above the drum for impelling the bolls therefrom, a crushing means positioned to receive said bolls and deliver the crushed material back to the grating, doffing means positioned to remove the fiber from the drum, and means to deliver said fiber to a receiving means.

2. A cotton cleaning machine comprising a casing having a rotatable drum mounted therein, said drum having a plurality of saw-like teeth covering the periphery, a slanting grating in the casing slightly spaced from the lower side of said drum, means for rotating said drum with the lower side moving toward the grating, whereby cotton bolls are engaged by said teeth, a beater element mounted above the drum for removing the bolls therefrom, a crushing means positioned to receive said bolls and deliver the crushed material back to the grating, a crushing means positioned below the drum to receive the material passing between the drum and the grating, a grating below said crushing means whereby a separation takes place, the fiber being engaged by the teeth on the revolving drum, doffing means positioned to remove the fiber from the drum, and means to deliver said fiber to a receiving means.

3. A cotton cleaner comprising a casing, a downwardly slanting separating grating mounted therein, an apron connected with the upper end of said grating, a hood forming with said apron a supply passageway, a drum mounted for rotation in the casing with its lower side slightly spaced from the lower end of the grating, said drum having a plurality of teeth mounted thereon whereby cotton and cotton bolls are picked from the grating, a beater element at the top of the drum rotative in the same direction whereby the bolls are removed therefrom, a crushing means positioned to receive said bolls and to deliver crushed material back to the grating, a doffing means positioned beyond the beater element for removing cotton from the drum, and means for conveying the cotton to a receiving means.

4. A cotton cleaner comprising a casing, a downwardly slanting separating grating mounted therein, means forming a passageway for delivering material to be operated on to said grating, a breaker bar at the base of said grating, a toothed rotor adjacent said bar and forming in conjunction therewith a crushing means, a drum mounted for rotation, its lower side closely adjacent the toothed rotor and slightly spaced from the lower end of the grating, said drum having a plurality of teeth slanting in the direction of rotation whereby cotton is engaged thereby, means to remove material other than cotton fibers from said drum, means to remove cotton fibers from said drum, and means to convey said fibers to a receiving means.

5. A cotton cleaner comprising a casing, downwardly and rearwardly inclined spaced rods forming the front wall of said casing, a toothed picker drum mounted in the casing with its forward side adjacent the lower portions of said rods, means for rotating the drum with its forward side moving upwardly, a rotary beater mounted above the drum and rotatable in a direction to impel material away therefrom towards said rods, and means adjacent the upper portions of said rods and in the path of movement of the impelled material for crushing the same and discharging it upon the rods.

In testimony whereof I affix my signature.

BERT R. BENJAMIN.